United States Patent [19]

Tinios

[11] Patent Number: 4,628,200
[45] Date of Patent: Dec. 9, 1986

[54] PULSE WHEEL SYSTEM WITH SHAFT MOUNTING

[75] Inventor: Pantelis G. Tinios, Mt. Arlington, N.J.

[73] Assignee: Westinghouse Electric Corp., Pittsburgh, Pa.

[21] Appl. No.: 642,906

[22] Filed: Aug. 20, 1984

[51] Int. Cl.⁴ .............................................. G01D 5/34
[52] U.S. Cl. ......................... 250/231 SE; 250/237 G
[58] Field of Search ................... 250/231 SE, 237 G; 356/395; 340/347 P

[56] References Cited

U.S. PATENT DOCUMENTS

| | | | |
|---|---|---|---|
| 3,098,152 | 7/1963 | Von Mathes | 250/231 SE |
| 3,995,156 | 11/1976 | Angersbach et al. | 250/237 G |
| 3,997,782 | 12/1976 | Willits | 250/231 SE |
| 4,033,883 | 7/1977 | Zinsmeyer et al. | 250/231 SE |
| 4,196,349 | 4/1980 | Yamada | 250/231 SE |
| 4,328,463 | 5/1982 | Avins | 340/34 TP |
| 4,386,270 | 5/1983 | Ezekiel | 250/231 SE |

*Primary Examiner*—David C. Nelms
*Attorney, Agent, or Firm*—D. R. Lackey

[57] ABSTRACT

A pulse wheel system including a pulse wheel and first and second detectors responsive thereto for providing first and second pulse trains having a predetermined phase shift between them. The detectors are mounted on a mounting plate which positionally relates the first and second detectors to the center of the pulse wheel, eliminating set-up adjustments.

1 Claim, 4 Drawing Figures

PULSE WHEEL SYSTEM WITH SHAFT MOUNTING

BACKGROUND OF THE INVENTION

1. Field of the Invention

The invention relates in general to pulse wheel systems, and more specifically to pulse wheel systems which generate first and second pulse trains having a predetermined phase shift between them, in response to rotation of a pulse wheel.

2. Description of the Prior Art

Pulse wheel systems may be used to develop first and second pulse trains which are processed to determine travel direction and distance traveled of a predetermined object, such as an elevator car. Speed of travel may also be determined from the pulses, if desired. In the prior art, two photoemitter-photodetector pairs are mounted on a mounting block and the mounting block is positioned relative to the teeth of a pulse wheel to enable the detector pairs to each develop a pulse train. In order to develop accurate information from the pulse trains, the pulse trains must have a 90 degrees phase difference between them. Since the adjustment of the detector mounting block is a three-axis adjustment which is made while the pulse wheel is rotating, it is difficult and time-consuming to make the adjustment, and extreme care must be taken to avoid the moving teeth of the pulse wheel. An oscilloscope or brush recorder is usually connected to receive the two pulse trains, and the detector mounting block is adjusted until the instrument shows that the pulse trains have equal on-off times and the desired phase shift.

SUMMARY OF THE INVENTION

Briefly, the present invention is a new and improved pulse wheel system which eliminates the three-axis adjustment of the prior art by non-adjustably relating the positions of first and second pulse-producing detector means relative to the rotational axis of the associated pulse wheel. In one embodiment of the invention, a rotatable element, such as a governor, driven by the device whose direction and position is to be monitored, such as an elevator car, is journaled for rotation on a shaft, and the pulse wheel is mounted for rotation with the rotatable element. A mounting plate is mounted on the shaft, and the first and second detector means are mounted on the mounting plate. The mounting plate includes openings for receiving the shaft and for orienting the first and second detector means, with the mounting plate being devoid of any means for changing the dimensions between these openings. Thus, it is only necessary to mount the mounting plate on the shaft at an axial position adjacent to the pulse wheel. This fixes all critical dimensions. No circumferential adjustment is required of the mounting plate about the longitudinal axis of the shaft, as any such circumferential position will still provide the desired phase shift between the pulse trains. The desired phase shift is obtained by the spacing between the first and second detectors, and by achieving like distances from the center lines of the detector means to the longitudinal axis of the shaft, all of which are fixed by the mounting plate.

BRIEF DESCRIPTION OF THE DRAWING

The invention may be better understood, and further advantages and uses thereof are readily apparent, when considered in view of the following detailed description of exemplary embodiments, taken with the accompanying drawing in which.

DESCRIPTION OF THE PREFERRED EMBODIMENTS

When the exact position of a movable object, such as an elevator car, must be determined to a predetermined resolution, a pulse wheel system is a convenient way to obtain information relative to the travel direction and distance traveled. First and second pulse trains responsive to the same pulse wheel, phase shifted by 90 degrees, may be processed to obtain travel direction, and since a pulse is produced for each standard increment of travel, such as 0.25 inch, the distance traveled in the travel direction is also easily determinable. If desired, the rate at which the pulses are produced may be detected to determine speed of travel. U.S. Pat. No. 4,433,756, which is assigned to the same assignee as the present application, discloses logic means suitable for processing two 90-degree phase-shifted pulse trains to obtain travel direction and distance, and this patent is hereby incorporated into the present application by reference. In order to obtain accurate information from two pulse trains, the phase shift between them must be 90 degrees. The present invention quickly and easily achieves the desired phase shift without time-consuming adjustment, either in the factory or in the field.

Figure 1:
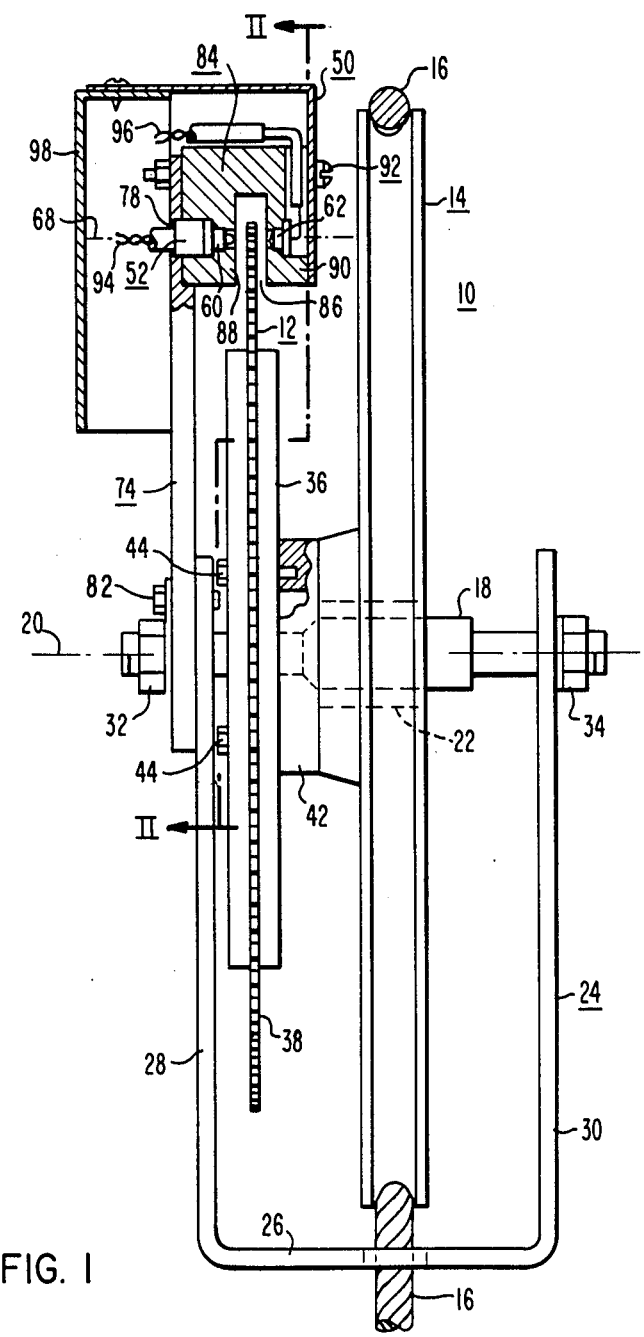
FIG. 1 is an elevational view of a pulse wheel system, constructed according to an embodiment of the invention.
Figure 2:
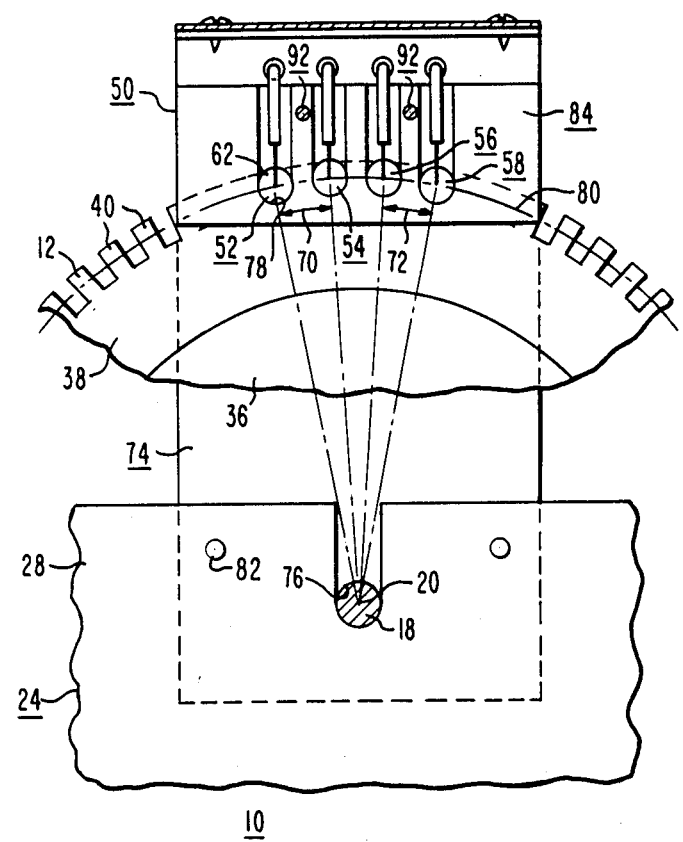
FIG. 2 is a crosssectional view of the pulse wheel system shown in FIG. 1, taken between and in the direction of arrows II—II.

Referring now to the drawings, and to FIGS. 1 and 2 in particular, there is shown a pulse wheel system 10 constructed according to an embodiment of the invention which includes a pulse wheel 12. The pulse wheel 12 of the system 10 must be arranged to be driven in response to movement of the device whose travel direction and travel distance are to be monitored. For purposes of example, the invention will be described relative to an elevator system having a governor sheave 14 which is rotated by a wire governor rope 16. The governor rope 16, which is connected to the elevator car, is reeved about the governor sheave 14, and also connected about a second sheave disposed at the opposite end of car travel, such as shown in U.S. Pat. No. 3,768,597, which is assigned to the same assignee as the present application.

Governor sheave 14 is journaled for rotation about a shaft 18 having a longitudinal axis 20, such as via bearings 22. Shaft 18 is supported near its ends via a substantially U-shaped steel frame 24 having a bight 26 and first and second upstanding legs 28 and 30, respectively. Nuts 32 and 34 may engage threads on opposite ends of shaft 18, to secure the shaft to the frame 24.

Pulse wheel 12 may include a disk-shaped mounting hub 36 and a washer-shaped flat blade 38 which extends outwardly from the hub 36. Blade 38 includes a series of perimetrically spaced discontinuities adjacent to its outer periphery, such as provided by uniformly spaced teeth 40. Pulse wheel 12 is mounted for rotation with sheave 14, with the rotational axis of the pulse wheel being coaxial with shaft 18. For example, sheave 14 may include a circular hub 42 which extends outwardly from one side of sheave 14, coaxial with the longitudinal axis 20, with the mounting hub 36 of the pulse wheel 12 being secured to hub 42 via a plurality of screws 44.

Pulse-producing detector means 50 is mounted to detect the discontinuities or teeth 40 of pulse wheel 12. Detector means 50 includes at least first and second photoemitter-photodetector pairs 52 and 54, respectively, with third and fourth pairs 56 and 58 also being illustrated in order to indicate that additional redundant positional and directional information may be developed, such as might be used in the emergency terminal slowdown control disclosed in copending application Ser. No. 524,811 filed Aug. 19, 1983, entitled "Elevator System," now U.S. Pat. No. 4,503,939, which is assigned to the same assignee as the present application.

Figure 3:
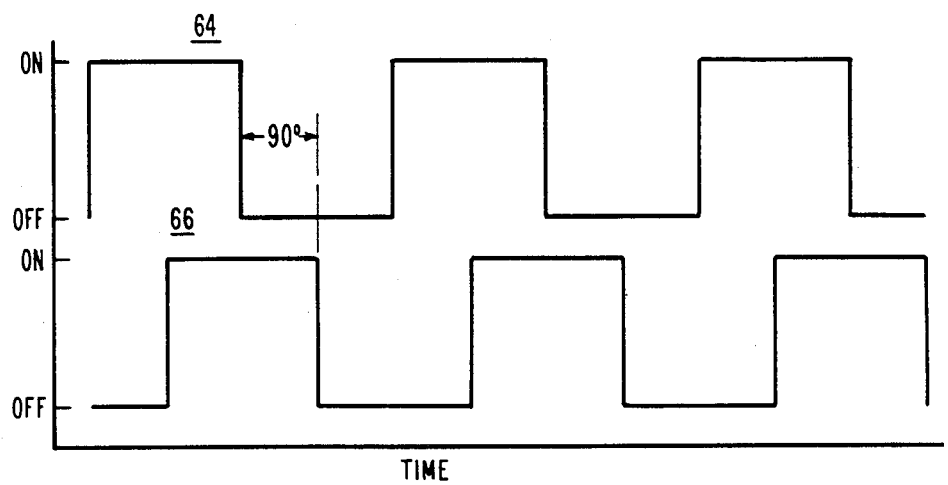
FIG. 3 is a timing diagram illustrating the desired phase shift between first and second pulse trains.

As shown in the cross-sectional view of detector means 50 in FIG. 1, each detector pair, such as detector pair 52, includes a photoemitter 60, such as a light-emitting diode, and a photodetector 62, such as a phototransistor. Each detector pair is disposed to detect the teeth 40 of the pulse wheel 12. Detector pair 52 will produce a first pulse train, such as pulse train 64 shown in FIG. 3, and the associated detector pair 54 will produce a second pulse train, such as pulse train 66 shown in FIG. 3. Each detector pair has a center line directed through the axes of its photoemitter and photodetector, such as center line 68 through the detector pair 52. The distance 70 between the center lines of detector pairs 52 and 54 is selected to provide a 90-degrees phase shift between pulse trains 64 and 66, as shown in FIG. 3. In one rotational direction of pulse wheel 12, pulse train 64 will lead pulse train 66 by 90 degrees, as illustrated in FIG. 3, and in the other rotational direction of pulse wheel 12, pulse train 66 will lead pulse train 64 by 90 degrees. In like manner, detector pairs 56 and 58 are spaced by a dimension 72 selected to provide a 90-degrees phase shift between their pulse trains.

Figure 4:
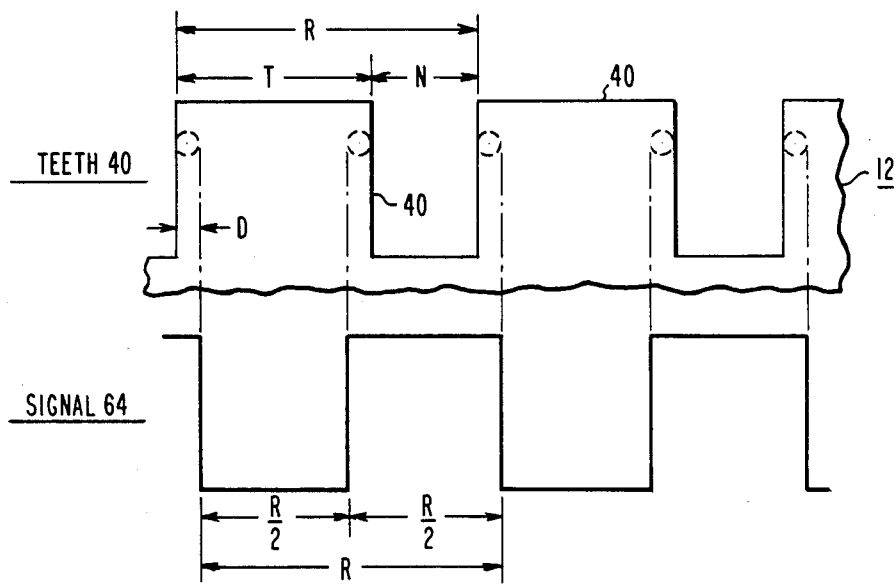
FIG. 4 illustrates the relationship between the spaced teeth on a pulse wheel and the resulting signal, in order to provide a signal having equal "on" and "off" times.

In order to provide an electrical signal, such as signals 64 and 66, having equal "on" and "off" times, as shown in FIG. 3, the diameter D of the beam of electromagnetic radiation generated by a detector pair must be taken into account in selecting the width T of the teeth 40, and the width N of the spaces or notches between the teeth 40 of the pulse wheel 12. This is illustrated in FIG. 4, which shows teeth 40 of the pulse wheel 12 in a straight line, instead of curved, in order to simplify the comparison between the teeth 40 and the resulting electrical or optical signal 64.

More specifically, if the desired resolution is R, the width T of each tooth 40 would be equal to: $T = \frac{1}{2}R + 2D$. The width N of the tooth spacing or notch would be equal to: $N = \frac{1}{2}R - 2D$.

Detector means 50 includes a metallic mounting plate 74 mounted on shaft 18, and the detector pairs 52, 54, 56, and 58 are supported by mounting plate 74. Mounting plate 74 includes an opening 76 sized to snugly receive shaft 18, and it includes means for locating the center lines of each detector pair relative to the center of opening 76, and thus relative to the longitudinal axis 20 of shaft 18. For example, mounting plate 74 may include an opening for each detector pair, with the center of each opening locating the exact desired position for the center line of the associated detector pair, such as opening 78 for detector pair 52. It is important that the centers of the locating openings for the detector pairs all lie on the periphery of the same imaginary circle 80 whose center lies on the longitudinal axis 20 of shaft 18. Thus, the distance from each detector pair to the rotational axis 20 is the same for all detector pairs. The opening 76 for shaft 18, and the openings for the detector pairs, such as opening 78, are all precision-drilled in metallic plate 74, which is devoid of any means for adjusting the dimensions between any of the openings. Thus, mounting plate 74 non-adjustably relates the positions of the detector pairs to the rotational axis 20 of the pulse wheel 12. It will be noted that the mounting plate 74 may be moved circumferentially about shaft 18 without disturbing any of the critical dimensions, and their relationship to one another. Changing the locations of the center lines of the detector pairs along circle 80 is of no importance, as the phase shift between the pulse trains will remain the same. Mounting plate 74 may be fixed to leg 28 of U-shaped member 24, such as via screws 82.

The specific means for mounting the detector pairs so their center lines are aligned with the centers of the orienting openings in plate 74 is not important. As illustrated, a metallic mounting block 84 may have a milled slot 86, and precision openings drilled through the legs 88 and 90 which define slot 86. The spacing between the openings will be exactly the same as the spacing between the centers of the openings which were precision-drilled in the mounting plate 74. The photoemitters may be disposed in the openings in leg 86 and the photodetectors in the openings in leg 90. The openings in the mounting plate 74 and the openings in the leg 88 are aligned, and nut-and-bolt combinations 92 are disposed through openings in block 84 and openings in mounting plate 74. These nut-and-bolt combinations are securely tightened once their desired alignment and orientation is achieved. Mounting plate 74 may have a support flange formed thereon for supporting the lower end of block 84, and for additionally aiding in aligning block 84 with the mounting plate 74. Wires, or fiber optics, such as wires 94 and 96, may be connected to the photoemitter and photodetector, respectively, and they may be covered by a housing 98 which also houses related power supplies and pulse-producing circuitry.

In summary, there has been disclosed a pulse wheel system which eliminates the X-Y-Z-axis adjustment of the prior art, by nonadjustably mounting the pulse producing detectors relative to the rotational axis of the pulse wheel. The center lines of the detectors lie on the periphery of an imaginary circle whose center lies on the rotational axis of the pulse wheel. The center lines of the detectors are non-adustably spaced to provide the desired phase shift between associated pulse trains.

I claim as my invention:

1. A pulse wheel system for developing at least first and second pulse trains having a predetermined phase shift between them, comprising:
   a pulse wheel including a rotational axis, and a series of perimetrically spaced discontinuities,
   a shaft having a longitudinal axis,
   a rotatable element journaled for rotation about said shaft,
   means mounting said pulse wheel for rotation with said rotatable element, coaxial with said shaft,
   mounting plate mounted on said shaft,
   and first and second detector means having predetermined center lines, said first and second detector means being mounted on said mounting plate to detect the discontinuities of said pulse wheel and provide first and second pulse trains in response thereto, said mounting plate having an opening for receiving said shaft and openings for orienting the center lines of said first and second detector means relative to the longitudinal axis of said shaft, with said mounting plate being devoid of means for changing the dimensional between its openings, with the center of the openings which orient the center lines of the first and second detector means being located a like distance from the longitudinal axis of the shaft, spaced apart on the periphery of a circle whose center coincides with the longitudinal axis of the shaft, and with the spacing between the center of the openings being selected to provide the predetermined phase shift between the first and second pulse trains, and wherein the series of perimetrically spaced discontinuities include teeth having a width T spaced by a dimension N, each detector means includes a beam of electromagnetic radiation having a diameter D, with the pulse wheel system providing pulse trains having a resolution R, and wherein the width T is equal to $\frac{1}{2}R+2D$ and the width N is equal to $\frac{1}{2}R-2D$, to provide pulse trains having equal on and off times.

* * * * *